Nov. 12, 1935.    F. RÜSBERG    2,020,801
CYCLIC MANUFACTURE OF POTASSIUM CARBONATE
Filed Aug. 10, 1932
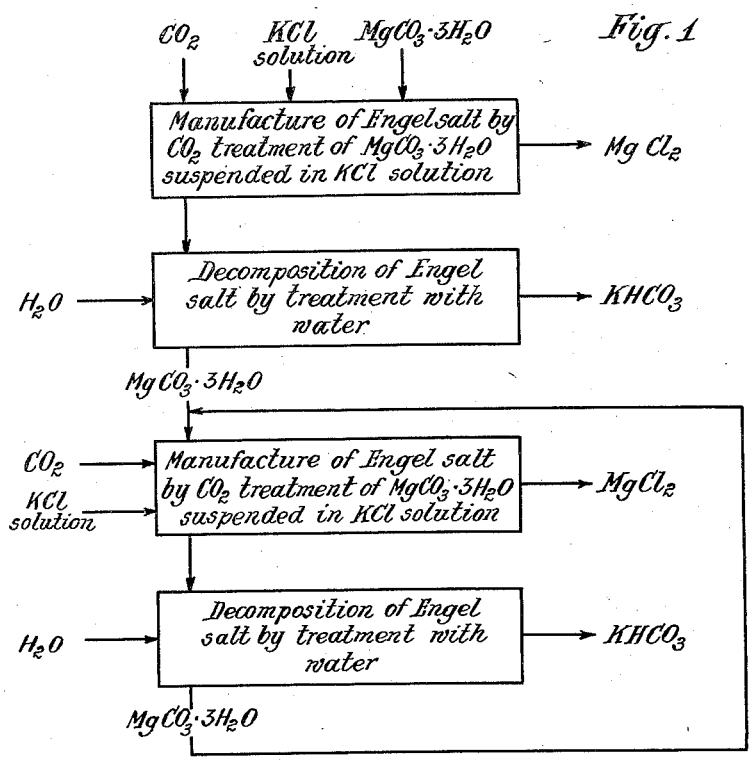
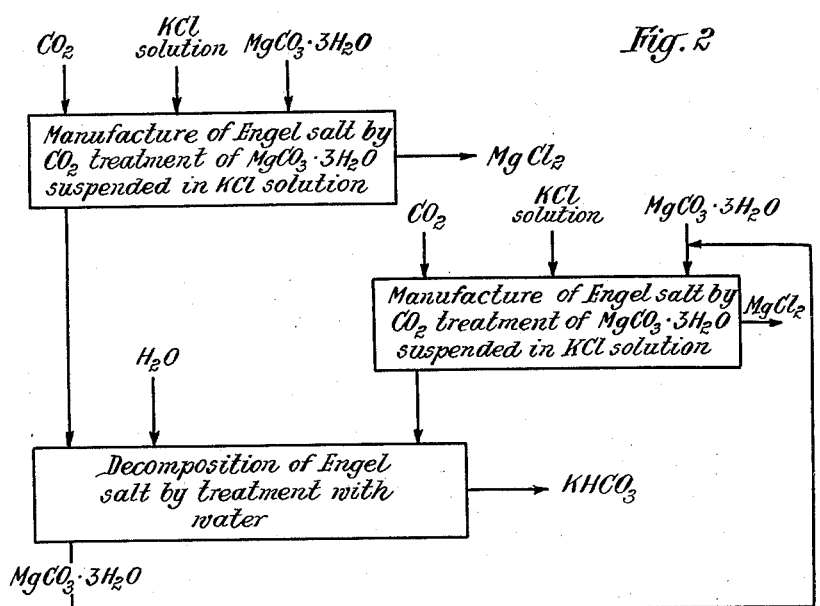
Inventor:
Friedrich Rüsberg
By Markat Clerk
Attys.

Patented Nov. 12, 1935

2,020,801

UNITED STATES PATENT OFFICE 2,020,801

CYCLIC MANUFACTURE OF POTASSIUM CARBONATE

Friedrich Rüsberg, Berlin - Niederschoneweide, Germany, assignor to Kali-Chemie, Aktiengesellschaft, Berlin, Germany Application August 10, 1932, Serial No. 628,260
In Germany September 29, 1931

2 Claims. (Cl. 23—63)

This invention relates to the manufacture of potassium carbonate from potassium salts of strong mineral acids and magnesium carbonate trihydrate.

It is known to make potassium carbonate by treating with carbon dioxide a suspension of magnesium carbonate trihydrate in an aqueous solution of potassium chloride, whereby a crystal water containing double salt of potassium bicarbonate and magnesium carbonate, named Engel salt, precipitates, which on decomposition with water at raised temperature furnishes an aqueous solution of potassium bicarbonate, which may contain potassium carbonate and solid magnesium bicarbonate trihydrate, which is used again for the manufacture of potassium carbonate from fresh potassium chloride. This process, which is called Engel-Precht method, is supposed to take place according to the following equations:

1. $2KCl + 3(MgCO_3.3H_2O) \pm CO_2 + H_2O =$
$2(KHCO_3.MgCO_3.4H_2O) + MgCl_2 + H_2O$;

2. $KHCO_3.MgCO_3.4H_2O + H_2O =$
$MgCO_3.3H_2O + KHCO_3 + 2H_2O$.

It will be seen from the equations, that one third of the magnesium carbonate trihydrate employed for the manufacture of Engel salt is consumed and converted into magnesium chloride, which is removed from the process. The other two thirds of magnesium carbonate trihydrate employed as starting material are recovered and are used again for the manufacture of Engel salt. When working in a cycle, which is the rule in the manufacture of potassium carbonate according to Engel-Precht, the consumed amount of trihydrate is replaced by adding a corresponding amount of fresh magnesium carbonate trihydrate to the trihydrate recovered by the decomposition of Engel salt and to employ this mixture for the manufacture of fresh Engel salt. This procedure has the disadvantage, that sludges are formed together with Engel salt, which sludges decrease the yield in double salt and make difficulties in the preparation, separation and handling of the Engel salt. Moreover the trihydrate of magnesium carbonate, which is used in a cycle has to be regenerated very often due to the presence of these sludges. The Engel-Precht method consists in treating with carbon dioxide a suspension of magnesium carbonate trihydrate in an aqueous solution of potassium chloride thereby forming Engel salt, that is crystal water containing double salt of potassium bicarbonate and magnesium carbonate, and magnesium chloride, decomposing the precipitated Engel salt with water at raised temperature and thereby forming magnesium carbonate trihydrate and potassium bicarbonate, separating out solid magnesium carbonate trihydrate, suspending the said trihydrate again in an aqueous solution of potassium chloride and repeating the treatment with carbon dioxide in the same manner as in the beginning of the process.

The main object of the invention is to provide for a cyclic method for making potassium carbonate according to Engel-Precht, in which the formation of sludges in the preparation of Engel salt, being an intermediate product, is reduced.

A further object of the invention is to provide for a method, by which a frequent regeneration of trihydrate of magnesium carbonate obtained by decomposition of Engel salt is avoided.

Investigations have shown, that the formation of sludges in the manufacture of Engel salt with a mixture of fresh magnesium carbonate trihydrate and magnesium carbonate trihydrate recovered by decomposition of Engel salt is to a great extent due to the presence of small amounts of lime, iron, alumina, and silica, practically always present in the fresh magnesium carbonate trihydrate introduced into the cyclic process. A magnesium carbonate trihydrate free from these impurities, such as a trihydrate, which has already been used in the cyclic process, forms much less sludge, which as a rule consists of basic magnesium compounds and the impurities of the fresh trihydrate.

According to the invention the formation of sludges in the preparations of Engel salt in the cyclic manufacture of potassium carbonate according to Engel-Precht is reduced, by carrying out separately the preparation of Engel salt with the amount of fresh magnesium carbonate trihydrate necessary for completion from the manufacture of the same double salt with the magnesium carbonate trihydrate obtained by decomposition of Engel salt in a previous operation. The Engel salt obtained by the two operations may be decomposed separately or together and the magnesium carbonate trihydrate obtained by this decomposition or these decompositions is then employed together for the manufacture of fresh Engel salt, whereas the fresh magnesium carbonate introduced into the process is used for a separation preparation of Engel salt. By this separate preparation of Engel salt with fresh magnesium carbonate trihydrate the greatest part of the impurities present in the fresh trihydrate is removed with the magnesium chloride from the process, thus decreasing the formation of sludge in the whole process. This separate preparation of Engel salt with fresh trihydrate may be considered as a purification of fresh trihydrate over the Engel-Precht process for the manufacture of potassium carbonate.

Examples 1. 1000 kg. of Engel salt with 13% MgO and 20% $K_2CO_3$ are prepared by treating with carbon dioxide a suspension of about 1450 kg. of magnesium carbonate trihydrate, obtained by decomposition of Engel salt with water in previous operations, in an aqueous solution of potassium chloride. There is practically no formation of sludge. On decomposing the 1000 kg. of Engel salt with water at temperatures between 40 and 90° C. about 905 kg. of magnesium carbonate trihydrate with about 13,8% MgO are obtained as solid residue.

560 kg. of Engel salt with 13,5% MgO and 21,5% $K_2CO_3$ are prepared by treating with carbon dioxide a suspension of about 800 kg. of fresh magnesium carbonate trihydrate, obtained by treatment of hydrated magnesia with carbon dioxide or by precipitating magnesium chloride solution with ammonium carbonates, in an aqueous solution of potassium chloride. There is only very little sludge formation. On decomposing the 560 kg. of Engel salt with water at temperatures between 40 and 90° C. about 535 kg. of magnesium carbonate trihydrate with about 14% of MgO are obtained.

The trihydrate obtained in the first decomposition step is added to the trihydrate obtained in the second decomposition step and the 1450 kg. of trihydrate are employed for the manufacture of about 1000 kg. of Engel salt as described in the first paragraph of the example. There is practically no sludge formation. Fig. 1 of the drawing illustrates the steps of the process.

2. 1000 kg. of Engel salt as in Example 1 are added to 560 kg. of Engel salt obtained from fresh trihydrate of magnesium carbonate. The mixture is decomposed with water at temperatures between 40 and 90° C. and about 1460 kg. of trihydrate of magnesium carbonate with about 13.8% of MgO are obtained as solid residue. This residue is employed for the manufacture of about 1000 kg. of Engel salt practically without sludge formation. These 1000 kg. of Engel salt are mixed with 560 kg. of Engel salt prepared separately from fresh magnesium carbonate trihydrate and the mixture is decomposed as described above. Fig. 2 of the drawing illustrates the steps of the process.

Instead of potassium chloride in the examples other potassium salts of strong mineral acids such as potassium sulfate may be employed.

The foregoing detailed examples have been given for clearness of understanding only, and no unnecessary limitations should be understood therefrom, but the appended claims should be construed as broadly as permissible in view of the prior art.

I claim:

1. In the cyclic manufacture of potassium carbonate from potassium chloride by the Engel-Precht method, the improvement of compensating the magnesium carbonate trihydrate spent in the manufacture of Engel salt in the cycle by introduction of corresponding amounts of Engel salt into the cyclic process and of decomposing said introduced Engel salt together with the Engel salt produced in the cycle and introducing the regenerated magnesium carbonate into the cycle.

2. In the cyclic manufacture of potassium carbonate from potassium chloride by the Engel-Precht method, the improvement of compensating the magnesium carbonate trihydrate spent in the manufacture of Engel salt in the cycle by introduction into the process of fresh magnesium carbonate trihydrate produced in a non-cyclic process, the steps of separately converting the magnesium carbonate trihydrate regenerated in the cyclic process and fresh magnesium carbonate trihydrate into Engel salt, uniting the two batches of Engel salt, decomposing the Engel salt with water at raised temperature and introducing the regenerated magnesium carbonate trihydrate into the cycle.

FRIEDRICH RÜSBERG.